_United States Patent Office_ 3,293,016
Patented Dec. 20, 1966

3,293,016
METHOD OF MANUFACTURING GLASS ARTICLES HAVING A HIGH MECHANICAL STRENGTH
Johannes Cornelissen, Emmasingel, Eindhoven, Netherlands, assignor to North American Philips Company, Inc., New York, N.Y., a corporation of Delaware
No Drawing. Filed Dec. 8, 1964, Ser. No. 416,873
5 Claims. (Cl. 65—30)

The invention relates to a method of manufacturing glass articles having a high mechanical strength which is retained after damage and to the articles manufactured by this method.

It is known to strengthen glass articles by replacing part of the alkali ions in a surface layer of the glass by alkali ions having a greater ionic radius, for example, by replacing sodium ions by potassium ions. This is effected by bringing the glass article into contact wtih a melt which contains such ions at a temperature which is at least 75° C. lower than the annealing temperature of the glass. By this replacement the lattice in the surface layer is so deformed that it is subjected to compressive stress.

Generally the resulting strengthening is not permanent in normal use of the articles. By damaging the surface the obtained strengthening is largely cancelled. It has now been found that in this case too thin a surface layer had been produced which lost its effect by the damage normally done in practical use. It has been found that a prolonged treatment of the articles in such a replacement bath cause the potassium ions to penetrate deeper into the glass surface, but this treatment also resulted in the disappearance of the initially produced compressive stress.

It is also known, however, that with a particular choice of the glass composition of the article a strengthening is obtainable which is resistant to heavy damage. The standard damaging test used consists in rotating the treated rod made of the respective glass in contact with fine abrasive paper. Glass which can be permanently strengthened after replacement of alkali ions by alkali ions having a greater ionic radius has a composition consisting mainly of alkali alumino silicate containing at least 5% of $Al_2O_3$ and at most 20% of other glass-forming components.

At a treating temperature higher than 500° C. the replacement of alkali ions, either sodium or lithium ions, by potassium ions may be efficiently carried out by immersing the glass articles in a melt of potassium nitrite for the required treating time. This applies particularly to the so-called "hard glasses," that is to say, glasses having a high softening temperature, which, as experiments showed, exhibited a very rapid replacement at a temperature above 500° C.

It was found, however, that the proportion of free potassium oxide in such a melt increased steadily owing to gradual decomposition of the nitrite. As a result the glass articles treated in the melt were attacked, although the ultimate increase in strength was not reduced. It was found that a potassium nitrite bath which had been heated to 550° C. for a few hours possessed so high a proportion of $K_2O$ as to give rise to attack of the glass articles.

Treatment in a melt which had been used for a comparatively short time so that the proportion of potassium oxide was not high enough yet to cause an immediate attack of the glass articles during the treatment, proved to reduce the chemical stability of the glass. After a few weeks the initially transparent surface of the treated articles gradually became dull and weathered.

Attempts were made to counteract this phenomenon by adding acid oxides to the melt. This provided no improvement and in some cases, for example, when boron oxide was added, even accelerated the decomposition of the potassium nitrite.

The invention provides a method by which the said disadvantage is completely eliminated, that is to say, that even a melt heated to 600° C. was stable for weeks, without the glass articles treated in it either being immediately attacked or exhibiting a reduced chemical resistance.

The method in accordance with the invention, by which glass articles consisting mainly of sodium and/or lithium aluminosilicate containing at least 5 mol percent of $Al_2O_3$ and at most 20 mol percent of other glass-forming components were immersed in a bath consisting of molten sodium nitrite at a temperature which is at least 500° C. and at least 75° below the annealing temperature of the glass, is characterized in that stannic oxide, metallic tin or metallic aluminum is added to the potassium nitrite bath. The amount of stannic oxide, tin or aluminum to be added depends upon the treating temperature and, for example, at 150° C. is at least 2 gm. per kgm. of the melt.

It should be noted that many additions have been tested and found ineffective. For example, anhydrous aluminum oxide or hydrated alumina proved useless, as did zinc oxide and basic oxides such as CaO or MgO. It has been found that red lead ($Pb_3O_4$) or other oxidising substances even accelerated the decomposition of the potassium nitrite.

The addition of the aforementioned active substances preferably is effected immediately after the preparation of a fresh melt. It is, however, also possible for a bath rendered useless by decomposition to be rendered fully useful again.

A bath treated in accordance with the invention is stable for a substantially indefinitely long period of time, that is to say, up to the instant at which the number of potassium ions in the bath is so reduced that either no replacement occurs or the rate of replacement has grown too slight.

The amount of added substance must be at least 2 gm., for example, about 5 gm., per kgm. of the melt. A larger amount is senseless but not detrimental. The said additions may take any form, for example, that of a powder, of lumps, of a foil or a sheet.

What is claimed is:
1. A method of strengthening glass articles consisting of an aluminosilicate of an alkali metal selected from the group consisting of sodium and lithium and containing at least 5 mol percent of $Al_2O_3$ and at most 20 mol percent of other glass-forming components comprising the step of immersing the glass articles in a bath of molten potassium nitrite at a temperature between 550° C. and at least 75° C. lower than the annealing temperature of the glass, said bath containing a constituent selected from the group consisting of stannic oxide, tin and aluminum.

2. A method of strengthening glass articles consisting of an aluminosilicate of an alkali metal selected from the group consisting of sodium and lithium and containing at least 5 mol percent of $Al_2O_3$ and at most 20 mol percent of other glass-forming components comprising the step of immersing the glass articles in a bath of molten potassium nitrite at a temperature between 550° C. and at least 75° C. lower than the annealing temperature of the glass, said bath containing at least 2 to 5 gm. per kgm. of a constituent selected from the group consisting of stannic oxide, tin and aluminum.

3. A method of strengthening glass articles consisting of an aluminosilicate of an alkali metal selected from the group consisting of sodium and lithium and containing at least 5 mol percent of $Al_2O_3$ and at most 20 mol percent of other glass-forming components comprising the step of immersing the glass articles in a bath of molten potassium nitrite at a temperature between 550° C. and at least 75° lower than the annealing temperature of the glass, said bath containing at least 2 to 5 gm. per kgm. of stannic oxide.

4. A method of strengthening glass articles consisting of an aluminosilicate of an alkali metal selected from the group consisting of sodium and lithium and containing at least 5 mol percent of $Al_2O_3$ and at most 20 mol percent of other glass-forming components comprising the step of immersing the glass articles in a bath of molten potassium nitrite at a temperature between 550° C. and at least 75° C. lower than the annealing temperature of the glass, said bath containing at least 2 to 5 gm. per kgm. of tin.

5. A method of strengthening glass articles consisting of an aluminosilicate of an alkali metal selected from the group consisting of sodium and lithium and containing at least 5 mol percent of $Al_2O_3$ and at most 20 mol percent of other glass-forming components comprising the step of immersing the glass articles in a bath of molten potassium nitrite at a temperature between 550° C. and at least 75° C. lower than the annealing temperature of the glass, said bath containing at least 2 to 5 gm. per kgm. of aluminum.

References Cited by the Examiner
UNITED STATES PATENTS 3,218,220  11/1965  Weber _____ 65—30

OTHER REFERENCES

Acloque et al.: "Mesure De La Resistance Mechanique Du Verre Apres Renforcement," publish. proc. of Symposium Sur la Resistance Mechanique du Verre et les Moyens de l'Ameliorer held in Florence, St. 9–61, pp. 213–223.

Kistler: "Stresses in Glass Produced by Nonuniform Exchange of Monovalent Ions," J. of Amer. Cer. Soc. vol. 45, No. 2, February 1962, pp. 59–68.

Mochel: "Improved Method of Glass Treatment and Product," Patent Journal, November 1962, p. 22 (South Afr. spec. #62-2353).

DONALL H. SYLVESTER, *Primary Examiner.*

G. R. MYERS, *Assistant Examiner.*

UNITED STATES PATENT OFFICE
CERTIFICATE OF CORRECTION

Patent No. 3,293,016            December 20, 1966

Johannes Cornelissen

It is hereby certified that error appears in the above numbered patent requiring correction and that the said Letters Patent should read as corrected below.

In the heading to the printed specification, after line 8, insert -- Claims priority, application Netherlands, Jan. 17, 1964, 6,400,308 --.

Signed and sealed this 24th day of October 1967.

(SEAL)
Attest:

Edward M. Fletcher, Jr.
Attesting Officer

EDWARD J. BRENNER
Commissioner of Patents